June 10, 1952  J. G. KERR  2,600,114
DUAL-PURPOSE ENVELOPE
Filed June 5, 1945  5 Sheets-Sheet 3

Inventor
J. G. KERR
By Mason, Fenwick & Lawrence
Attorneys

June 10, 1952     J. G. KERR     2,600,114
DUAL-PURPOSE ENVELOPE
Filed June 5, 1945     5 Sheets-Sheet 5

Inventor
J. G. KERR
By Mason Fenwick & Lawrence
Attorneys

Patented June 10, 1952

2,600,114

UNITED STATES PATENT OFFICE 2,600,114

DUAL-PURPOSE ENVELOPE

James Gordon Kerr, Washington, D. C.

Application June 5, 1945, Serial No. 597,666

12 Claims. (Cl. 229—73)

This invention relates generally to envelopes, and specifically to dual purpose envelopes for mailing to an addressee, and remailing to the addressor.

It is customary for many business houses in mailing out merchandise, statements, premium notices, installment payment or loan notices, etc., to enclose return envelopes to be used by the receiver to forward new orders or checks to cover statements or notices. There are many difficulties which accompany this procedure. Care must be taken to include a return envelope with the matter inserted in each forwarding envelope. Bills, statements, premium notices, etc., must be separately purchased, stock maintained, plus the additional labor of folding before insertion. The receiver often fails to place his address upon the return envelope, and this, coupled with the fact that he frequently neglects to enclose the identifying portion of the notice or statement as requested, makes identification of the sender difficult. Neglect on the part of the customer to notify the business house of changes of address leads to incorrect records and misdirected and, therefore, delayed mail.

The object of this invention is to provide a dual purpose envelope which may have inscribed thereon, before mailing, the name and address of both the addressee and the addressor, with that of the addressor being covered while the envelope is being forwarded to the addressee and uncovered by the act of resealing for return to the addressor.

Another object of the invention is to provide such an envelope wherein the resealing of the envelope for return to the original sender will uncover the address of the original sender and cover the address of the original addressee, including any corrected or changed address which the post office may have noted thereon.

A further object of the invention is to provide an envelope incorporating these features which also provides means whereby confidential information forming a document of original entry facilitating the identification of the remittor's account and proper accounting credit thereto may be placed upon the envelope and covered during transit to the addressee; the act of opening the envelope disclosing the information to the recipient and the act of resealing the envelope for return again hiding the information from view.

A still further object of the invention is to provide such an envelope having as an integral part thereof a plurality of sheets for receiving duplicate impressions of the information and address placed upon the envelope, the sheets being superimposed for carbon impressions, or adjacently arranged for successive impressions in certain types of addressing and billing machines.

An object of the invention is to provide such an envelope wherein the opening of the envelope is facilitated to insure its proper opening and preclude the possibility of accidental destruction of the return portion or mutilation of the information carried by the envelope.

In general, the object of this invention is the provision of an envelope which may be used as a forwarding vehicle and as a return envelope, and which may contain certain information valuable to original addressee and addressor alike, which information cannot become separated from the envelope and is hidden from public view during transit and serves as an important basis of accounting credit.

Other objects of the invention will become apparent from the following detailed description taken in conjunction with the accompanying drawings in which the same characters of reference are used to denote identical parts throughout.

Referring to the drawings in detail, and first turning to that form of the invention shown in Figures 1 to 8 inclusive, the invention comprises a basic envelope 1 and an attached cover sheet 2 which forms the face of the forwarding envelope.

Figures 1, 3:
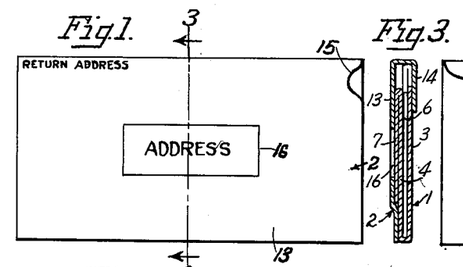
Figure 1 is a front elevational view of an envelope embodying the basic principles of the invention.
Figure 3 is a vertical transverse section taken on the line 3—3 of Figure 1.
Figure 2:
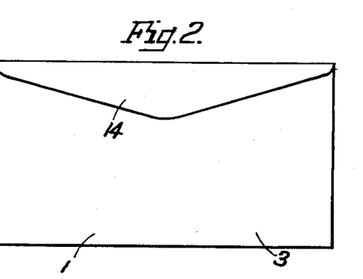
Figure 2 is a rear elevation thereof.

The basic envelope 1 is preferably formed from a paper sheet to provide a back panel 3 and a front panel 4, the front panel being a continuation of the back panel, the line of juncture being at their bottom edges. The upper edge of the back panel may be curved so that the center is below the corners in the usual fashion to facilitate inserting material into the envelope. End flaps 5 and 6 extend from the back panel 3 and are folded over to underlie and be attached to the front panel 4 to complete the pocket portion of the envelope.

Figure 4:
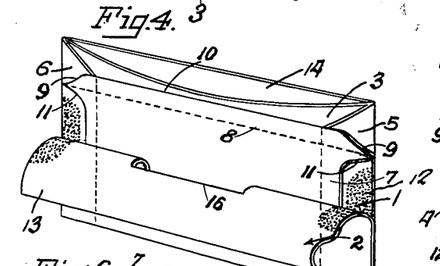
Figure 4 is a perspective view of the envelope after it has been slit across the top edge.
Figure 5:
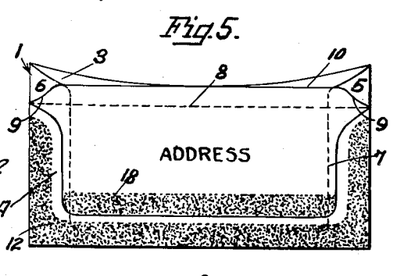
Figure 5 is a front elevation of the envelope after the front face has been stripped off.

Extending from the upper edge of the front panel is a closure flap 7, the closure flap and panel being separated by a scored, perforated, or otherwise weakened line 8. The front panel is provided with V-shaped notches, as at 9, the V starting at the line 8 and extending inwardly. A fold line, 10, extends across the front panel connecting the vertices of the V-notches so that the closure flap will lie flat against the front panel. The closure flap has its side edges converge sharply inward, as at 11, to reduce the width of the flap to less than that of the body of the envelope. The depth of the flap is such that when folded against the front panel along the line 10, as shown in Figures 3, 4 and 5, the bottom of the flap is spaced from the bottom of the front panel, as is clearly shown in Figure 5. By thus proportioning the flap, a margin of the front panel is exposed on both sides and at the bottom of the flap.

Upon the exposed margin of the front panel a coating of adhesive is applied, as shown at 12. This serves to secure a cover sheet 13 to the face of the front panel of the basic envelope. The adhesive used is of any well known type which will firmly hold the cover sheet in place and yet permit the cover sheet to be "peeled off" when it is pulled downward, as shown in Figure 4. The cover sheet is of rectangular outline provided with an extension 14, preferably triangular, which forms a primary closure flap for the entire envelope. Although it has been stated that the primary closure flap 14 is preferably triangular, the particular shape of the flap is of little consequence, but the flap 14 should be of smaller dimensions than the closure flap 7 attached to the basic envelope for reasons to be explained later. Both the flap 7 and the flap 14 are gummed along their lower edges in the usual manner. Cover sheet 2 may be notched near one or both upper corners, as at 15, to facilitate opening at the proper point without injuring the remainder of the envelope.

Thus it will be seen that the envelope comprises a basic pocket-forming portion having a closure flap folded back to lie flat against the front panel of the pocket portion, and a cover sheet attached to the front of the pocket portion along its side and bottom edges and provided with a closure flap to close the pocket portion. In the complete envelope, the flap 7 lies between the front panel of the pocket portion and the cover sheet.

A cut-out window 16 is provided in the cover sheet, centrally located, to frame the position generally occupied by the forwarding address. The window is not covered and the surface of the closure flap 7 is visible therethrough.

Before proceeding with a description of the use of the envelope, it should be stated that prior to adhering the cover sheet to the envelope and before the closure flap is folded back on the line 10, the name and address of the business house purchasing the envelopes is printed on the front panel of the basic envelope in the manner now practiced with return envelopes. This address is indicated at 17 in Figure 6 of the drawings. After this is done, the flap 7 is folded down into position and the cover sheet secured in place before shipment to the purchaser.

In use, the envelope may be inserted into a typewriter or addressing machine and the name of the addressee marked upon it in the space defined by the window 16. As this window is not covered, the address will be placed upon the flap 7 which shows through the window. A notice, bill, or other material is then inserted into the pocket portion of the basic envelope found between the front and back panels 4 and 3, and the primary closure flap 14 is folded over the back of the basic envelope and sealed, as is shown in Figures 2 and 3. Upon receipt by the addressee, a letter opener or the finger is inserted at the notch 15 and the envelope slit across the top along the fold line between the cover sheet and the closure flap in the usual manner. The notch 15 forms a guide to aid in starting the slit properly and thus prevent damage to the remaining portion of the envelope. As soon as the envelope is slit, the front face, or cover sheet, is peeled off, as shown in Figure 4. This reveals the return envelope. Slitting the cover gives access to the pocket portion of the envelope, and the bill or notice contained therein may be removed.

The stub of the bill or notice may then be reinserted in the pocket portion of the envelope along with a check or money order and the flap 7 turned over the top of the envelope and sealed against the back panel ready to be mailed back to the original addressor. Although the primary closure flap 14 remains attached to the back panel of the envelope, the larger flap 7 will cover the flap 14, and its gummed area will be attached to the back panel of the envelope.

It will be noted that the forwarding address which was typed through the window in the cover sheet onto the flap 7 is on the underside of the flap when the flap is in sealing position for return to the addressor. It will also be noted that the address of the original addressor which is printed upon the front panel of the basic envelope is revealed by folding the flap into sealing position.

Upon return of the envelope to the original addressor, the envelope is opened in the usual manner by slitting across the top. The V-notches provide a guide for beginning the slit, and the weakened line 8 between the cover sheet and the closure flap ensures the slit occurring at the proper place and also prevents a ragged tear. The closure flap 7 is provided with a second perforated, or weakened line 18, extending transversely across the flap just above the gummed portion of the flap and below the position occupied by the address of the original addressee. After slitting the envelope along the line 8, the flap may be torn off along the line 18, thus furnishing a neat slip to accompany the check for purposes of identification. This slip will contain the name and address of the customer as well as any change of address which the postal authorities may have marked upon it. This will serve to identify the account as well as furnish the necessary information to keep the mailing lists up to date.

Now referring to that form of the invention shown in Figures 9 to 14 inclusive, a basic envelope 19 of any standard design is employed. This envelope in general consists of front and back panels 20 and 21, and a closure flap 22. A cover sheet is used with this form also, but it differs somewhat from that in the form just described. The cover sheet is designated 23 and comprises three sections: a relatively thin section 24 which is attached with adhesive to the front panel 20 of the envelope about midway between the top and bottom edges of the envelope and extends the full width of the envelope; a main section 25 projects from the section 24, which is coextensive with the envelope in width and extends downward to a point near the lower edge of the envelope; and, a secondary closure flap 26 folded under the main section 25 to lie between the main section and the front panel of the basic envelope. The flap 26 is reduced in width, as was the flap 14 of the first form. The underside of the main panel 25, at the side edges in the margin not covered by the narrowed closure flap, is provided with adhesive spots 27, which attach the main section of the cover sheet to the front panel of the basic envelope. Thus the secondary closure flap 26 is securely held in place under the main section of the cover sheet.

Figures 6, 8, 9, 11:
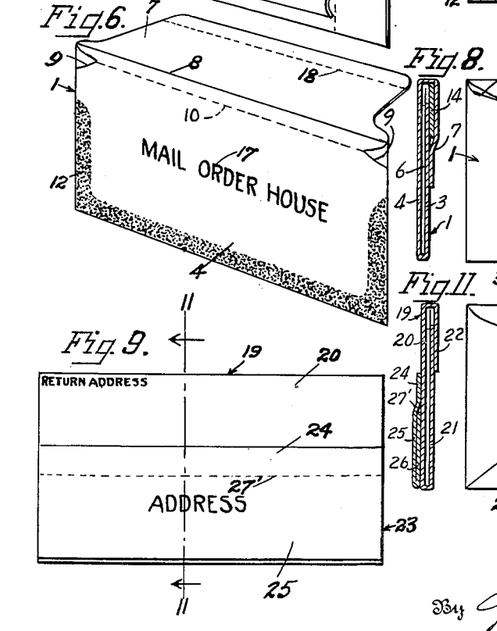
Figure 6 is a perspective view of the return portion of the envelope with the sealing flap turned over from its position of repose as it would be in the act of sealing.
Figure 8 is a sectional view taken on the line 8—8 of Figure 7.
Figure 9 is a front elevation of a modified form of envelope.
Figure 11 is a sectional view taken on the line 11—11 of Figure 9.
Figure 7:
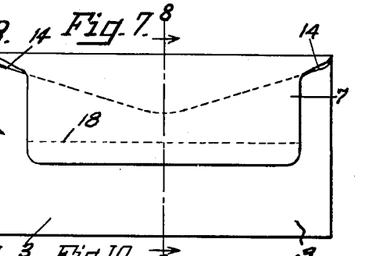
Figure 7 is a rear elevation of the sealed return envelope.
Figure 10:
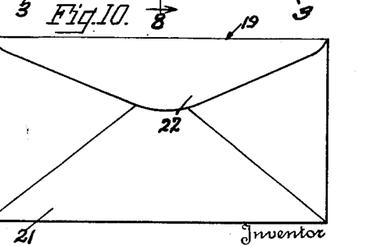
Figure 10 is a rear view of the envelope shown in Figure 9.
Figures 12, 14:
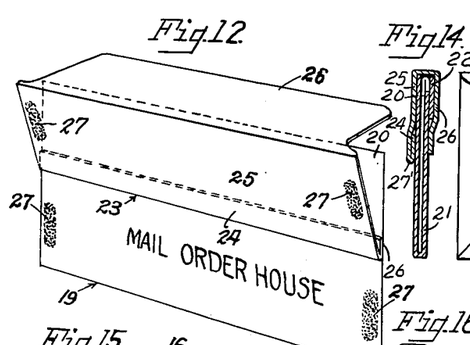
Figure 12 is a perspective view of the envelope shown in Figure 9 preparatory to resealing.
Figure 14 is a sectional view taken on the line 14—14 of Figure 13.
Figure 13:
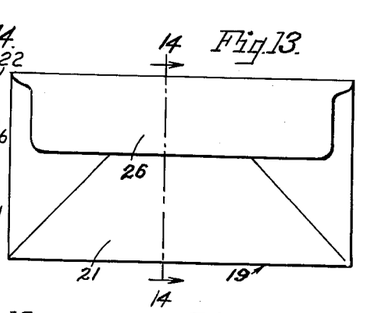
Figure 13 is a rear elevation of this modified envelope sealed for return.

This envelope may be placed in a typewriter in the usual manner and the forwarding address typed upon the face of the main section 25 of the cover sheet, in the position shown in Figure 9. When delivered, the recipient will open the envelope in the usual manner by slitting across the top. To convert the envelope to a return envelope, the cover sheet is grasped at the lower edge and lifted, breaking loose the adhesive spots 27. The fact that the cover sheet terminates slightly above the bottom edge of the envelope provides a selective grip, making it very easy to do this. The main section of the cover sheet is then folded up along the fold line 27' and the closure flap 26 is folded over the top of the envelope. This is clearly illustrated in Figure 12. After the desired insertions have been made in the pocket portion, the closure flap is sealed. As in the form previously described, the secondary closure flap is larger than the primary closure flap so that the gummed area of the secondary flap will not adhere to the primary flap. When the cover sheet is lifted and the envelope resealed, the address of the original addressor is revealed and the address of the original addressee, original postage, return address, etc., concealed on the underside of the cover sheet.

That form of the invention shown in Figures 15 to 18 inclusive is quite similar to that shown in Figures 1 to 8, and the same reference characters are applied to similar parts. The basic envelope is identical to that of the first form and the cover sheet is the same in outline and method of attachment to the basic envelope. However, in this form of the invention, the vertical side cuts made in forming the window 16 are continued above the window as at 28 and, with a line of fold 29, define a tab 30 which may be lifted to expose additional surface of the underlying closure flap 7. The underside of the tab 30 is provided with a blockout area 31 which may be solid black or any heavily printed marking which will make it impossible for confidential information to be legible through this area. The lower edge of the tab 30 is gummed so that it may be adhered to the face of closure flap 7 when the tab is lowered. A perforated tear-line 32 separates the gummed and blockout areas.

Figure 15:
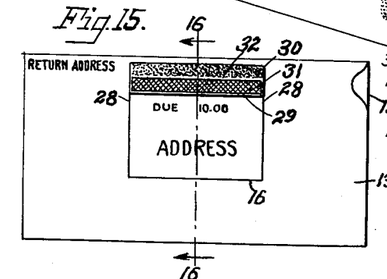
Figure 15 is a front elevation of a modified form of the envelope shown in Figures 1 to 8 inclusive.
Figures 16, 17:
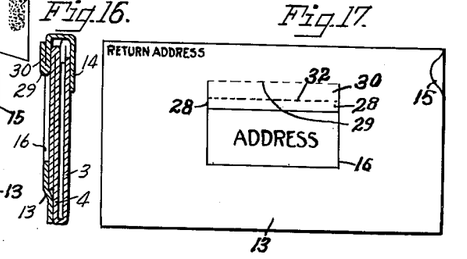
Figure 16 is a section taken on the line 16—16 of Figure 15.
Figure 17 is a front elevation of the same envelope ready for mailing.
Figure 18:
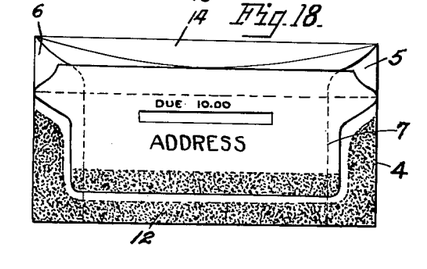
Figure 18 is a view of the modified form shown in Figure 15 after the envelope has been opened and the front cover peeled off.
Figure 19:
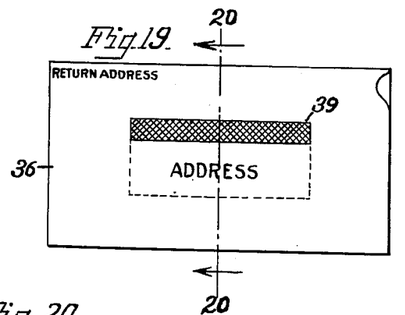
Figure 19 is a front elevation of a further modified form of envelope.
Figure 20:
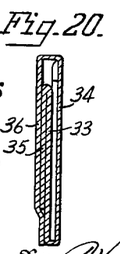
Figure 20 is a section taken on the line 20—20 of Figure 19.
Figure 21:
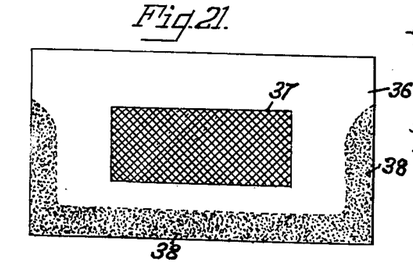
Figure 21 is a rear view of the cover sheet of the envelope of Figure 19.
Figure 22:
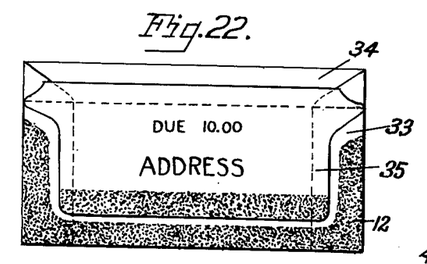
Figure 22 is a view of the envelope of Figure 19 with the cover sheet peeled off.

This envelope is inserted in a typewriter with tab 30 folded back in the position shown in Figures 15 and 16, and the forwarding address is typed in the lower part of the window opening. On the part of the closure flap 7 which is exposed in the upper part of the window and which will be covered by the tab when folded down, confidential information, such as the amount of a bill or premium, may be typed. After the envelope has been removed from the typewriter, the tab 30 is folded down and the gummed portion adhered to the closure flap 7. This effectually conceals the confidential information during transit to the addressee.

Upon receipt, the envelope is slit and the cover sheet peeled off, the tab 30 being torn along the perforated line 32 in the same operation. This will reveal all of the information to the recipient. After the proper check has been inserted in the pocket portion, the closure flap 7 is folded over and sealed as has been described.

This form of the invention has a number of advantages. Not only does it eliminate the use of two envelopes, but it also makes the use of separate bills, etc. unnecessary. It has the further advantage of having the amount of the bill and any other desired information in a concealed portion on the secondary flap of the envelope, which ensures this information being returned with the payment to serve in identifying and properly crediting the remittance. This is accomplished without the use of carbon paper, etc.

Figures 19 to 22 inclusive show another form of the invention. Here the pocket portion of the invention is the same as in the first form, having front and back panels 33 and 34, and a secondary closure flap 35 extends from the front panel as before. The cover sheet in this form is a continuation of the back panel 34 and forms a primary closure flap 36. The back of the cover sheet is provided with a rectangular carbon spot 37 centrally located and of sufficient area to cover the space which is to be utilized for the address and confidential information which is to be placed on the envelope. The cover sheet is gummed on its lower and side edges as at 38, for adherence to the front panel of the basic envelope when the envelope is to be sealed. The cover sheet may be cut out to embrace the space to be used for confidential data to let the black surface of the carbon sheet show through as a concealing block out, or this space may be blocked out, as at 39, by heavy printing. It is necessary that some means be provided to hide the typing which is to be placed in this area, and either of the foregoing methods will suffice.

In use, this envelope is placed in the typewriter and the address placed just below the blocked out space 39. The amount of the bill or payment is typed in the blocked out space or black carbon surface where the heavy printing will effectually hide it. All of the typing will be reproduced on the secondary closure flap by the carbon spot 37. Thus the forwarding address appears on both the cover sheet and the secondary closure flap and the confidential material is legible only on the secondary closure flap. The envelope is then sealed by moistening the adhesive 38 and securing the cover sheet in place.

Upon recepit, the envelope is slit and the cover sheet is peeled off revealing the information carried on the closure flap. The secondary closure flap is folded over, as previously described, to seal the envelope for return.

Figure 23:
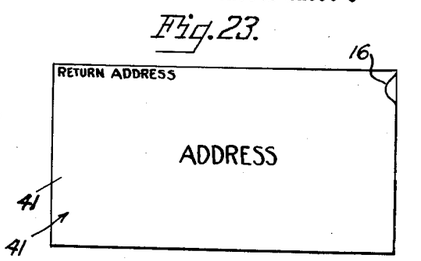
Figure 23 is a front elevation of another form of envelope.
Figures 24, 25, 26, 27, 28, 29:
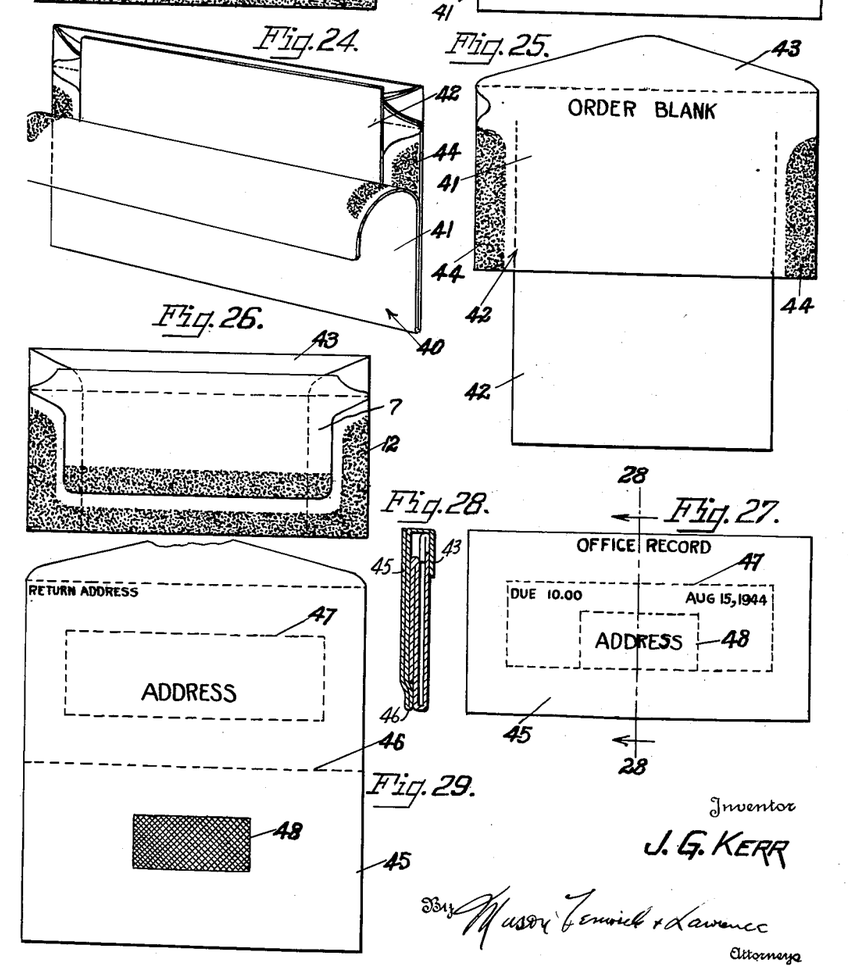
Figure 24 is a perspective view of a partially opened envelope of the form shown in Figure 23.
Figure 25 is a rear view of the unfolded cover sheet of this form.
Figure 26 is an elevational view of the return portion of the envelope.
Figure 27 shows an envelope with an office record sheet attached and folded upon the envelope in position for marking both office record and envelope.
Figure 28 is a section taken on the line 28—28 of Figure 27.
Figure 29 is an elevation of the envelope with the office record sheet folded down.

In that form of the invention shown in Figures 23 and 26, the basic envelope is identical to that of the first form of the invention. The cover sheet 40 is composed of three fold-defined sections; the outside facing sheet 41 for the envelope, an extension 42 to this sheet, and a primary closure flap 43. The extension 42 is narrower than the full envelope and is comparable in width to the secondary closure flap carried by the basic envelope. In this form the adhesive is applied to the cover sheet only at the edges in the areas 44. The extension 42 is designed to be folded against the underside of the facing sheet so as to be obscured from view when the cover sheet is affixed to the basic envelope. The address is typed upon the front of the cover sheet and the envelope sealed by means of the closure flap 43. The envelope is slit upon receipt and the cover sheet peeled off. In this form, the cover sheet is not discarded, for when the extension is folded down, the rear side of the cover sheet forms an order blank which may be conveniently used when a new supply of goods is needed. After the order blank is filled out, it is inserted in the pocket portion of the basic return envelope and the envelope sealed by means of the secondary closure flap. This form of order blank identifies the purchaser whose signature may be illegible by means of the original address appearing on the back, together with any forwarding address entered on it by the postal authorities in its original delivery. Thus customer mailing addresses may be brought up-to-date.

Figures 27 to 31 show a form of envelope by means of which an office record is provided simultaneously with the addressing of the envelope. This form also shows means whereby a single impression will reproduce necessary data on certain parts of the envelope and omit it from other parts where it is not desired.

The construction of the envelope is similar to the first form described, the only exception being an additional sheet 45 attached to the lower edge of the cover sheet and separable therefrom along a perforated line 46. The sheet 45 is an office record and is attached to the envelope for convenience in handling. The cover sheet is provided with a relatively large carbon spot 47 on its underside which will serve to reproduce data onto the closure flap of the basic envelope. The office record sheet is also provided with a carbon spot 48 smaller in area than the spot 47. The carbon spot 48 is placed on that side of the office record sheet which will contact the cover sheet when the record sheet is folded up along the line 46, as is shown in Figures 27 and 28. It will be noted from the dotted line showing in Figure 27 that the outlines and positions of the carbon spots 47 and 48 are such that they overlie a common area within the outline of spot 48, but that the spot 47, being larger, covers an additional marginal area at the sides and top of the spot 48.

This envelope is placed in a typewriter with the office record-sheet folded up against the cover sheet. The required information and address are typed. Figure 27 shows the position of data upon the record-sheet. It can be seen that the address is placed in that area which is framed by both carbon spots so that duplicate impressions will be made on both the cover sheet and the secondary closure flap carried by the basic envelope. The confidential information is typed outside the area occupied by the carbon spot 48 but within the outlines of the carbon spot 47. This information, therefore, will not appear on the cover sheet but only on the secondary closure flap. After the typing is completed, the envelope is withdrawn from the typewriter and the office record-sheet detached for filing. The envelope is then handled in the manner of those previously described.

Addressing machines are designed to make duplicate impressions upon a plurality of joined sheets. Some feed from the side and operate upon a series of laterally extending sheets. Others feed from the front, and the sheets are arranged one above the other. Either of these arrangements may be used with the envelope of the present invention. The sheets would be attached either to the bottom of the cover sheet or at the side edge. For purposes of disclosure, only the side-extending sheet is shown. However, a description of one form should serve for both.

Figures 30, 31, 32, 33, 34, 35, 36, 37:
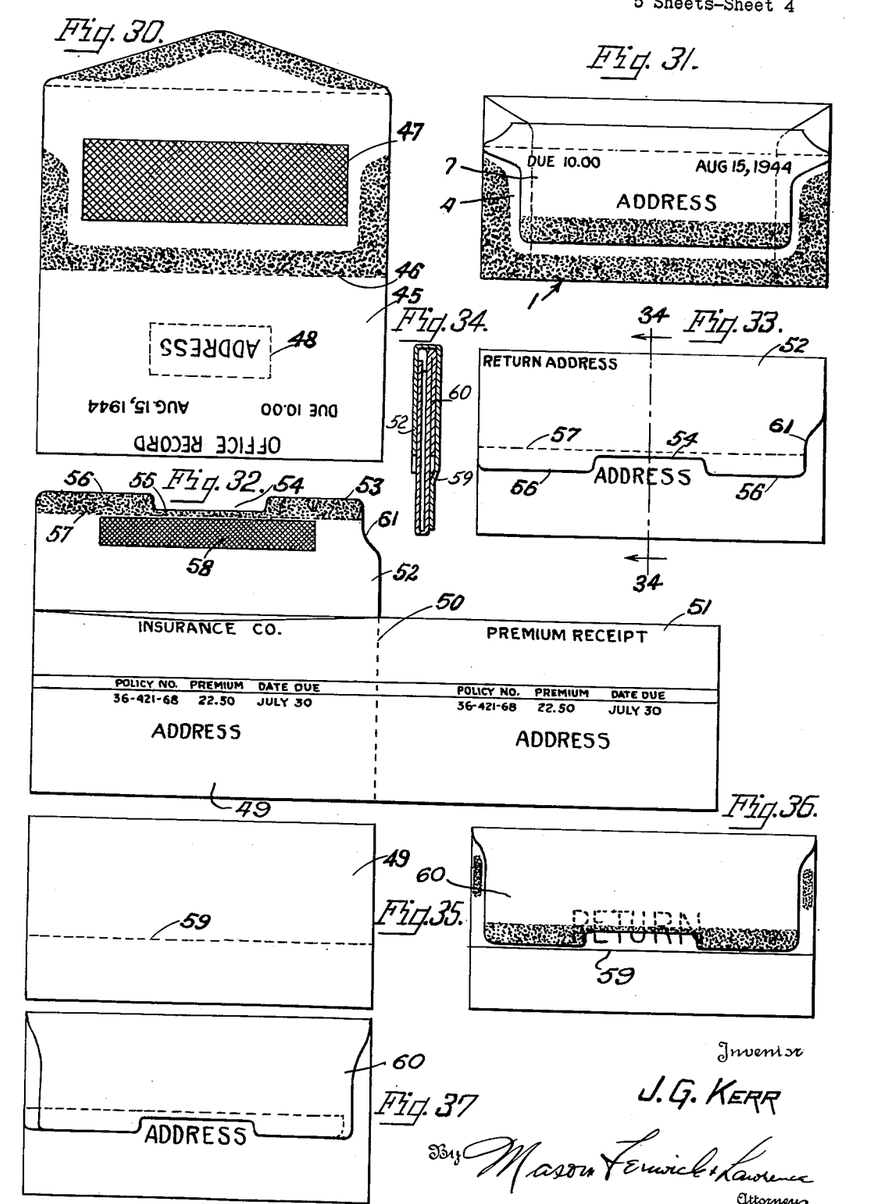
Figure 30 is a rear view of the cover sheet of this form removed from the envelope.
Figure 31 is a view of the return envelope.
Figure 32 is an elevation of a further modified form in which the office record is attached at the side of the cover sheet.
Figure 33 is an elevational view of the envelope shown in Figure 32 after it is sealed for mailing.
Figure 34 is a section taken on the line 34—34 of Figure 33.
Figure 35 is a rear view of Figure 34.
Figure 36 is a rear view after the cover sheet has been removed.
Figure 37 is a view of the return envelope sealed for mailing.
Figures 38, 39, 40, 46:
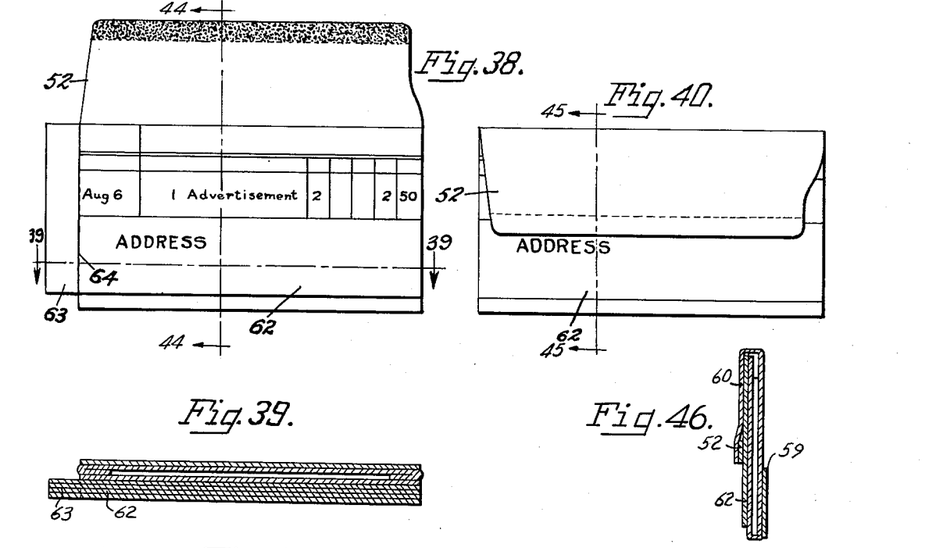
Figure 38 is an elevation of a still further modification.
Figure 39 is a horizontal section taken on the line 39—39 of Figure 38.
Figure 40 is a view similar to Figure 38 showing the envelope sealed.
Figure 46 is a vertical section taken on the line 46—46 of Figure 43.
Figure 41:
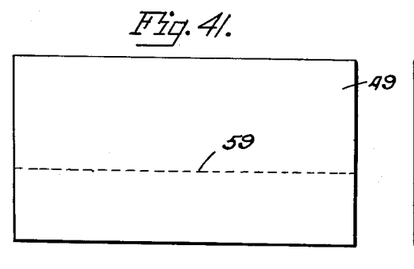
Figure 41 is rear view of Figure 40.
Figure 42:
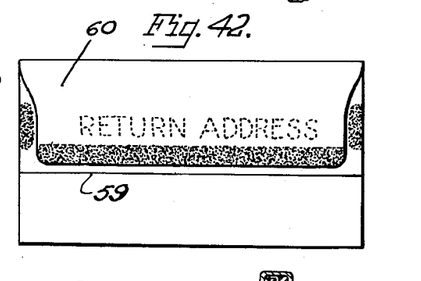
Figure 42 is a view similar to Figure 41 with the cover sheet removed.
Figures 43, 44:
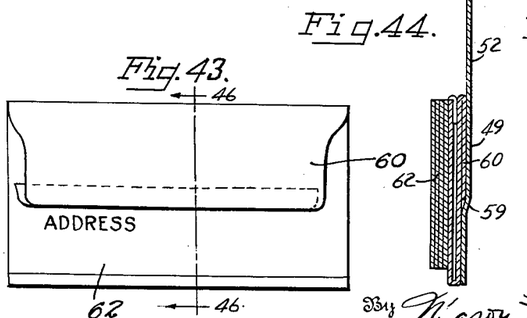
Figure 43 is a view of the sealed return envelope.
Figure 44 is a vertical section taken on the line 44—44 of Figure 38.
Figure 45:
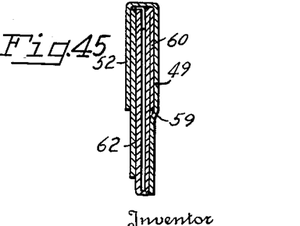
Figure 45 is a vertical section taken on the line 45—45 of Figure 40.

Figures 32 to 37 show this form. The cover sheet 49 is one of a series of connected sheets, the sheets being separable along a perforated line 50 for detachment from the cover sheet. The blank 51 may be an office record. As indicated in Figure 32, this form of the invention is readily adaptable to use in mailing out premium notices or the like.

Contrary to the practice described hereinbefore, the address and confidential information are to be placed upon the back panel of the basic envelope. This panel is, therefore, printed in any desired manner to correspond to the office record-sheets which are attached to the cover sheet and are to receive duplicate impressions of the material placed upon the back panel of the envelope. After the envelope and attached sheets are run through the addressing machine, the office record is torn off.

As the back panel of the envelope contains confidential information as well as the address, means must be provided to obscure the confidential information while leaving the address visible. To accomplish this the primary closure flap 52 attached to the cover sheet is of slightly different design. The closure flap must be of sufficient length to cover the confidential information. It must also have a gummed area 53 which must not encroach upon the areas occupied by this information nor by the address. The gummed area, therefore, extends transversely across the lower portion of the closure flap with the upper edge of the gummed area contacting the back panel of the envelope just below the position occupied by the confidential information. As most addressing, or billing, machines place the address rather closely below the billing or premium amount, the lower edge of the closure flap must be cut away to form an arch 54 to frame the upper portion of the address. This leaves a relatively thin section of gummed surface 55 bridging the space between the wider areas 56. The gummed area is separable from the remainder of the flap along the perforated line 57. A block-out spot 58 is provided on the flap to overlie the confidential information to make it impossible to read this information through the closure flap.

It will be noted in Figures 34, 35 and 36, which shows the cover sheet side of the envelope, that the cover sheet 49 is provided with a line of perforations 59 running horizontally across the sheet and spaced from the upper edge of the envelope a distance slightly greater than the length of the secondary closure flap 60 attached to the basic envelope. When the envelope is received by the original addressee, he will insert his finger or a letter opener into the space provided by notch 61 and tear the flap along line 57. This releases the flap from the adhered gummed portion so that it may be raised to reveal the hidden information. The flap and the upper portion of the cover sheet may then be removed along the line 59 and discarded. This uncovers the secondary flap 60 and frees it for use in resealing the envelope.

The secondary closure flap 60 is similar in shape to the primary closure flap 52, so that when the envelope is resealed, the confidential information on the back panel of the basic envelope will be covered as before. Folding over the secondary closure flap into sealing position uncovers the return address which is on the front panel of the basic envelope.

In that form of the invention shown in Figures 38 to 43, the envelope is quite similar to that of the form just described. The primary purpose of this form is for use where a plurality of record sheets are to be marked by a single impression. A number of sheets 62 are provided in book form; each of the sheets having a stub 63, the main portion of the sheets and the stubs being separable along a perforated line 64. All of the stubs are adhesively fastened together, the main portion of the sheets being free from one another. The back sheet of the group is pasted, or otherwise secured, to the back panel of the basic envelope in such a position that the perforated line 64 is in alignment with one edge of the envelope. The envelope may be placed in a typewriter and any desired information placed thereon, including the address. When this is completed the operator will grasp the envelope in one hand and the stubs 63 in the other and by a quick pull separate the lower sheet from the balance of the book. The primary closure flap of the envelope may then be folded over and the envelope sealed as usual. The remaining sheets of the group may be used at various times to form address sheets to be pasted on the front of additional unmarked envelopes, which may serve as follow-ups in case a remittance is not received in response to the original bill, without the necessity of retyping the later notices, bills, etc. and insuring their return with any remittance for its identification and credit.

While in the above several modifications of the invention have been shown and described, it is to be understood that various changes may be made from the precise structure disclosed without departing from the spirit of the appended claims.

What I claim is:

1. A dual purpose envelope comprising pocket forming panels, a cover panel adhesively attached to one of said pocket forming panels, the pocket forming panel to which the cover panel is attached having an address thereon, a closure flap attached to one of said pocket forming panels, a second closure flap attached to said cover panel, one of said closure flaps being of less width than said pocket forming and cover panels and folded to lie therebetween and of sufficient length to cover the address on said cover panel, the adhesive attaching said cover panel to said pocket forming panel being at three marginal edges of said panels beyond the edges of said closure flap lying therebetween.

2. A dual purpose envelope comprising, a basic envelope and a cover sheet, the basic envelope comprising a pocket portion having front and back panels, and a secondary closure flap emanating from one of said panels, said flap being of less width than said panels and folded to lie against the panel to which it is attached between said panel and the cover sheet, said cover sheet comprising a facing panel for said basic envelope and a primary closure flap attached to said facing panel, the facing panel being adhesively secured to said panel to which the secondary closure flap is attached, the adhesive being at the lower and both side marginal edges of said panels beyond the edges of said closure flap lying between said panels.

3. A dual purpose envelope comprising, pocket forming panels, a secondary closure flap attached to one of said panels, said panel carrying the closure flap having a line of fold spaced from its line of attachment to said closure flap whereby the closure flap and a portion of the panel to which it is secured may be folded back to lie against the panel to which the closure flap is attached, said closure flap being reduced in width whereby a marginal portion of the underlying panel projects beyond said closure flap, a cover panel adhesively secured to said marginal portion of said panel, and a primary closure flap attached to said cover panel.

4. In an envelope as claimed in claim 3, said fold line terminating in notches cut in side edges of said panel.

5. In an envelope as claimed in claim 3, said secondary closure flap having a gummed area along its outer edge, said secondary closure flap being provided with spaced parallel weakened lines extending completely across said flap whereby a section of said flap may be torn out.

6. In an envelope as claimed in claim 2, a carbon spot on the under side of said facing panel whereby legends impressed upon said facing sheet will be reproduced on said underlying secondary closure flap.

7. In an envelope as claimed in claim 2, a carbon spot on the under side of said facing panel, a blocked-out area on the face of said facing sheet within the outline of said carbon spot, whereby legends impressed upon said facing sheet will be reproduced on said underlying secondary closure flap and legends impressed on the blocked-out area will be indiscernable.

8. In an envelope as claimed in claim 2, said cover sheet including a removable extension adapted to overlie said facing panel, said facing panel having a carbon spot on its under side and said extension having a smaller carbon spot on its under side positioned to overlie said first mentioned carbon spot when the extension is folded upon the facing panel.

9. A dual purpose envelope comprising, a basic envelope and a covering sheet, the basic envelope comprising a pocket portion having back and front panels and a secondary closure flap emanating from one of said panels and having a gummed area along the free edge thereof, the panel from which said flap emanates being adapted to receive a return address and said secondary closure flap being folded against the panel from which it emanates and being of less width than said panel and of sufficient length to cover the return address on said panel, said cover sheet comprising a facing panel and said basic envelope having a primary closure flap attached to said facing panel and having a gummed area along the free edge thereof, said facing panel being adhesively secured to said panel to which the secondary closure flap is attached, the adhesive being at the lower and both side marginal edges of said panels beyond the edges of said closure flap lying between said panels, the primary closure flap adapted to seal against the other of said panels of the basic envelope and being of a length equal to that of the secondary closure flap, the panel against which the secondary flap seals being adapted to receive a forwarding address and additional desired information spaced above said forwarding address, and both said primary closure flap and said secondary closure flap being adapted to conceal said other information and reveal said forwarding address when in sealing position, the gummed areas of said flaps contacting said panel on a horizontal line between said forwarding address and said other information.

10. In a dual purpose envelope as claimed in claim 9, both said primary and said secondary closure flaps having scored lines adjacent their gummed areas, and said cover panel having a scored line adjacent its bottom line of adhesion to the basic envelope.

11. A dual purpose envelope comprising, a basic envelope and a cover sheet, said cover sheet being adhesively attached to said basic envelope along the bottom and side edges thereof, to form a pocket between said basic envelope and said cover sheet, said basic envelope comprising a pocket portion having front and back panels and a secondary closure flap emanating from one of said panels, said flap being of less width than said panels and folded to lie in the pocket formed between said basic envelope and said cover sheet, said cover sheet comprising a facing panel for said basic envelope and a primary closure flap attached to said facing panel.

12. A dual purpose envelope comprising, a basic envelope and a cover sheet, said basic envelope comprising a pocket portion having front and back panels and a closure flap emanating from one of said panels folded back to lie against the panel from which it emanates, said cover sheet comprising a panel adhesively secured to one pocket forming panel below the edge of said closure flap, and a second closure flap having a gummed area adapted to be adhered to the opposite pocket forming panel, a weakened line adjacent each of said adhered areas, an extension to said cover panel, and a plurality of sheets similar to said cover panel having similar extensions, said extensions being adhesively joined together and said sheets and said extensions being separable along weakened lines, whereby a plurality of sheets may be addressed simultaneously, and separated from said envelope for future use as address panels.

JAMES GORDON KERR.

REFERENCES CITED

The following references are of record in the file of this patent:

UNITED STATES PATENTS

| Number | Name | Date |
|---|---|---|
| 365,890 | Weaver | July 5, 1887 |
| 604,722 | Carter | May 31, 1898 |
| 886,449 | West | May 5, 1908 |